United States Patent [19]

Haas et al.

[11] 4,029,701

[45] June 14, 1977

[54] SWEETENING WITH HYDROHALIDE SALTS OF DIPEPTIDE SWEETENERS

[75] Inventors: Gerhard J. Haas, Woodcliff Lake, N.J.; Jeffrey H. Berg, Riverdale, N.Y.

[73] Assignee: General Foods Corporation, White Plains, N.Y.

[22] Filed: Mar. 30, 1972

[21] Appl. No.: 239,789

[52] U.S. Cl. .......................... 426/548; 260/112.5 R
[51] Int. Cl.$^2$ .......................................... A23L 1/236
[58] Field of Search ..................... 99/141 A, 141 R; 260/112.5; 426/548

[56] References Cited

UNITED STATES PATENTS

| | | | |
|---|---|---|---|
| 3,475,403 | 10/1969 | Mazur | 99/141 A |
| 3,492,131 | 1/1970 | Schlatter | 99/141 A |
| 3,642,491 | 2/1972 | Schlatter | 99/141 A |
| 3,678,026 | 7/1972 | Arigyoshi | 99/141 A |
| 3,695,898 | 10/1972 | Hill | 99/141 A |
| 3,798,204 | 3/1974 | Nakajima et al. | 426/548 X |

OTHER PUBLICATIONS

Mazur et al., Structure–Taste Relationships of Some Dipeptides, J. Amer. Chem. Soc. May 7, 1969, pp. 2684–2691.

Mazur et al., Structure–Taste Relationships of Aspeartic Acid Amides J. of Medicinal Chemistry, vol. 13, No. 6, 1970, pp. 1217–1221.

*Primary Examiner*—Joseph M. Golian
*Attorney, Agent, or Firm*—Bruno P. Struzzi; Daniel J. Donovan; Thomas R. Savoie

[57] ABSTRACT

Readily soluble, sweetening compositions comprising the hydrohalide salts of dipeptide sweeteners.

15 Claims, No Drawings

SWEETENING WITH HYDROHALIDE SALTS OF DIPEPTIDE SWEETENERS

BACKGROUND OF THE INVENTION

This invention relates to dipeptide sweeteners and more particularly to their salts which have improved solubility without significant loss of original sweetness.

It has recently been found that certain dipeptide compounds possess an intense sweetness. Examples of these compounds are set forth in U.S. Pat. No. 3,475,403 issued Oct. 28, 1969, 3,492,131 issued Jan. 27, 1970 and in the following published foreign patents; Republic of South Africa Pat. application No. 695,083 filed July 12, 1969, Republic of South Africa Patent Application No. 695,910 filed Aug. 14, 1969, German Pat. No. 2,054,545 published May 19, 1971 and British Pat. No. 1,042,488 published Sept. 14, 1966, the British patent being the primary reference for the hydrochloride salt.

Generically, these compounds are represented by the Formula:

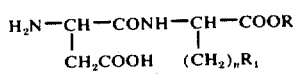

$$H_2N-CH-CONH-CH-COOR \quad \quad I$$
$$\quad\quad | \quad\quad\quad\quad\quad\quad |$$
$$\quad\quad CH_2COOH \quad (CH_2)_nR_1$$

Wherein R represents the lower alkyls, lower alkylaryls and cycloalkyls; n stands for integers 0–5; $R_1$ represents (a) phenyl group, (b) lower alkyls, (c) cycloalkyls, (d) $R_2$

where $R_2$ is hydroxy, lower alkoxy, lower alkyl, halogen, (e) $S(O)_m$(lower alkyl) where n is 1 or 2 and provided m is 0, or 2, , (f)

where $R_3$ represents an hydroxy or alkoxy and (g)

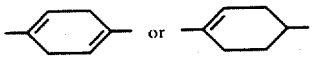

single or double unsaturated cycloalkyls with up to eight carbons.

Most suitable among these compounds are the lower alkyl esters of aspartyl phenylalanine (U.S. Pat. No. 3,492,131) wherein the stereochemical configuration is DL-L, L-L, DL-DL, or L-DL. Illustrative of the lower alkyl esters are methyl, ethyl, propyl, isobutyl, and the like, with the methyl ester being preferred for sweetness.

The dipeptides of Formula I have significant sweetening properties. Problems have arisen however, with the use of these compounds in dry systems in that their rate of solution into aqueous medium is markedly slower than sucrose, as exemplified by the methyl ester of L-aspartyl-L-phenylalanine.

SUMMARY OF THE INVENTION

It has been found that the hydrohalide salts of dipeptide sweeteners maintained their sweet characteristics and exhibit improved solubility compared to the unsubstituted dipeptide. Specifically, the hydrochloride salts of the lower alkyl esters of aspartyl phenylalanine are sweet and in all cases are faster to dissolve than the unsubstituted aspartyl phenylalanine esters. Since the formation of salts involve structural modifications of the aspartic acid portion of the components of Formula I, the maintenance of the sweet character was surprising because of contradictory information which appeared in the May 7, 1969 issue of the "Journal of the American Chemical Society" Vol. 91, No. 10, 2684 at 2685 concerning the L-aspartyl-L-phenylalanine methyl ester; "The presence of both the free, unsubstituted amino and one carboxyl group of aspartic acid as well as the distance between them and the absolute configuration of the asymmetric carbon are completely criticl" [for sweetness].

This claim was reiterated in a later publication appearing in the Journal of Medicinal Chemistry, 1970, vol. 13, No. 6, p. 1217 entitled "Structure-Taste Relationships of Aspartic Acid Amides" by Mazur et al. in which emphasis was made on the necessity of maintaining a free, unsubstituted $NH_2$ and one $CO_2H$ on the aspartic acid portion of the dipeptide. Again, the maintenance of this structure for sweetness was stressed.

The hydrohalide salts of the dipeptide sweeteners are prepared by substituting the amine group on the aspartic acid portion. The resulting salts are extremely fast-dissolving compared to unsubstituted dipeptide sweeteners and surprisingly are sweet which is unexpected in view of the journal articles previously mentioned.

The general purpose of this invention is to provide sweeteners that have all the advantages of similarly employed dipeptides and have none of the previously mentioned disadvantages. To attain this, the present invention comprises a structurally modified dipeptide to obtain a readily soluble hydrohalide salt of the sweetener.

DESCRIPTION OF THE INVENTION

The dipeptide salts of this invention are described by the Formula

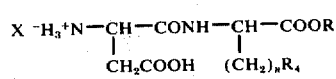

$$X^-H_3{}^+N-CH-CONH-CH-COOR \quad \quad II$$
$$\quad\quad\quad | \quad\quad\quad\quad\quad\quad |$$
$$\quad\quad\quad CH_2COOH \quad (CH_2)_nR_4$$

wherein: the stereochemical configuration is DL-DL, DL-L, L-DL or L-L; X represents a halide; n represents an integer of 0 to 5; R represents lower alkyl, lower alkylaryl and cycloalkyl; $R_4$ represents (a) lower alkyl, (b) a substituted or un-substituted, unsaturated, partially saturated or totally saturated six carbon hydrocarbon ring provided that when substituted, the substituent is at the four position and is hydroxy, lower alkoxy, lower alkyl or halogen; and c) $S(o)_m$ (lower alkyl) provided that n is 1 or 2 and m is 0, or 2.

Representatives of the salts of the invention are L-aspartyl-L-phenylglycine methyl ester hydrochloride, L-aspartyl-L-phenylalanine methyl ester hydrochloride, L-aspartyl-L-cyclohexylalanine methyl ester hydrochloride, L-aspartyl-L-tyrosine methyl ester hydrochloride, L-aspartyl-L-tyrosine ethyl ester hydrochloride, L-aspartyl-L-O-methyl tyrosine methyl ester hydrochloride, L-aspartyl-L-O-ethyl-tyrosine methyl ester hydrochloride, L-aspartyl-L-O-ethyl - tyrosine methyl ester hydrochloride, L-aspartyl-L-S-methyl cystein methyl ester hydrochloride, L-aspartyl-L-methionine lsulfone methyl ester hydrochloride and the like.

The salts are prepared by forming a solution of the dipeptide sweetener and the hydrohalide in a solvent and removing the solvent by known means. This can be done by forming a solution of the dipeptide in a solvent and contacting the dipeptide with the hydrohalide to form a soluble salt or by dissolving the dipeptide in an acidified solvent medium.

For example, in the case of the hydrochloride salt of aspartyl phenylalanine methyl ester, an aqueous solution of this dipeptide is neutralized with an equimolar concentration of hydrochloric acid. The resulting solution is freeze dried, yielding a hydrochloride salt of aspartyl phenylalanine methyl ester which is equally as sweet as the unsubstituted dipeptide but which is approximately 50 times faster to dissolve.

The significance of the fast-dissolving properties of the hydrohalide salts, particularly the hydrochloride salts cannot be overemphasized in an age where almost without exception, everything in the food and beverage field is an instant product and geared toward convenience for the consumer particularly in saving time. The salts also fill the need for a fast-dissolving, low calorie sweetener for the calorie-cautious public.

The hydrohalide salts are extremely useful in beverage systems. They may be added to liquid beverages in the form of tablets or the like. With dry beverages they may be intermixed with other ingredients. Sugar substitutes resembling sucrose in bulk form can easily be prepared by either admixing or dissolving with and dehydrating known bulking agents. Because of the dipeptide salts high rate of insolubility in aqueous systems they are ideal as sweetening agents in dry systems requiring rapid preparation such as beverages.

These hydrohalide salts, particularly the hydrochloride, are also fast-dissolving in carbonated water. The advantages of using the dry instantaneously-soluble salts to sweeten carbonated beverages where stirring would be undesirable are evident. For example when aspartyl phenylalanine methyl ester is incorporated into a carbonated beverage, the amount of stirring needed to effectively put the aspartyl phenylalanine ester into solution removes most, if not all carbonation. However, when the hydrochloride salt of aspartyl phenylalanine methyl ester is incorporated into the same system, the solubility of the salt alleviates the need of stirring and carbonation is maintained while the salt dissolves and sweetens the beverage in a matter of seconds.

The hydrohalide salts of dipeptide sweeteners can be incorporated into all types of foodstuffs, the most suitable being the substantially dry food systems which are reconstituted with water at the time of preparation. A dry system is necessary in order to prevent hydrolysis of the salt and water break-down of the dipeptide itself which occurs after storage in a moist or liquid system. Of course, the salts could be incorporated into a liquid medium but there's little advantage over employing the unreacted dipeptide itself.

Moisture resistant dipeptide salts are the preferred embodiment of this invention for the rapid sweetening of dry or aqueous foods particularly beverages, especially carbonated beverages where no mixing can be tolerated. The way to achieve moisture resistance is to protect the salt in a dry carrier. The carrier employed should be rapidly soluble in water and should be resistant to moisture to prevent hydrolysis of the salt and dipeptide and consequently a loss of sweetness and solubility after a prolonged period of storage. Suitable carriers for incorporating the sweet dipeptide salts are hydrophilic colloids such as gelatin, gums, dextrins; water-soluble or dispersible carbohydrates such as hydrolyzed starches, for example, the corn syrup solids, lactose, maltose, sucrose etc.; or solid polyhydric alcohols such as Mannitol and the like.

Generally, the preferred fixative materials are the sugars and corn syrup solids since these are usually used in powdered food formulations as sweetening agents. However, if it is intended that the product be stored under conditions such that the powdered mix will be exposed to humid air, special hermetically sealed packaging should be employed or preferably non-hygroscopic carriers resistant to water adsorption and yet cold water soluble such as Mannitol and enzymatically modified dextrins having a dextrose equivalent between 5–10 and little or no glucose but having a preponderance of trimer, hexamer or heptamer polymers of glucose which impart non-hygroscopic properties.

The amount of water added intially to the carbohydrate material is not critical. Any amount can be used varying from the least amount necessary to effect hydration of the carbohydrate to an amount sufficient to completely disperse or dissolve the carbohydrate as long as the quantity is adequate for incorporation of the salt. What is critical is the subsequent removal of a sufficient amount of water to prevent hydrolysis of the salt during storage. Formation of the carrier, therefore, involves the wetting of said carrier to dissolve and incorporate the hydrohalide and the subsequent removal of a sufficient amount of water to prevent hydrolysis of the hydrohalide.

The economics of the process also influences the amount of water to be added to the carbohydrate, for example, if the sweetening composition is to be freeze dried it is necessary, from a cost standpoint, to use as little water as possible because water removal in a freeze dryer is expensive and time consuming.

The drying method can be any of the well known drying methods such as spray drying, freeze drying or drum drying. The selection of the drying method will be influenced primarily by the economics of the method. The three methods mentioned for drying were all tested and all proved to be equally suitable for fixing the hydrohalide salt with the carrier.

The fast-dissolving sweetening compositions of the present invention can be packaged as is for addition to liquid beverages or can be packaged with dry food and beverage systems such as cake mixes, pudding mixes, gelatin desserts, "Tang," "Koolaid" and the like. The shelf storage life of the hydrohalide salts of dipeptide sweeteners can be extended indefinitely if it is incorporated in a dry food or beverage system and is protected or stored under conditions of very low humidity.

The hydrohalide salts of the dipeptide sweeteners, the hydrochloride salt of L-aspartyl-L-phenylalanine methyl ester being the preferred embodiment, are, therefore, distinct improvements over the unsubstituted dipeptides because they are fast dissolving in themselves and alleviate numerous problems occurring in any food beverage system where the rate of solubility of an additive is an important factor.

The processes of this invention are further illustrated but not limited by the following examples:

EXAMPLE I

The hydrochloride salt of aspartyl phenylalanine methyl ester was prepared by recrystallizing the sweetener from an HCl solution in the following manner:

Four grams of aspartyl phenylalanine methyl ester were dissolved in 50 ml. of a 0.05 M HCl solution. A voluminous precipitate separated from this solution a few minutes after stirring at room temperature. The needles were filtered off under vacuum and vacuum air dried. At a concentration of 0.07% (by weight) the needles dissolved with stirring in room temperature water in less than 5 seconds and in approximately 30 seconds in cold carbonated water without stirring as compared to the unsubstituted aspartyl phenylalanine methyl ester which required a total of 5 minutes to dissolve completely. The resulting dipeptide salt solution had the same sweetness intensity as the unmodified aspartyl phenylalanine methyl ester and no sour taste was detectable.

EXAMPLE II

The hydrobromide salt of aspartyl phenylalanine methyl ester was prepared by freeze-drying the sweetener from an HBr solution in the following manner:

aspartyl phenylalanine methyl ester (1.48 g; 0.00526 mole) was dissolved in 0.05026 M HBr (50 ml; 0.00526 mole) and the resulting solution was freeze-dried. The freeze-dried material dissolved instantaneously (0.07% by weight — the optimum sweetness level) in cold carbonated and non-carbonated water as compared to the unmodified aspartyl phenylalanine methyl ester which required 4.5 to 5 minutes to dissolve. The freeze-dried hydrobromide salt has the same sweetness intensity as unmodified aspartyl phenylalanine methyl ester and no sourness is detectable.

EXAMPLE III

The hydrochloride salt of L-aspartyl-L-phenylalanine methyl ester was prepared in the manner described in Example II. A solution consisting of equal parts by weight of L-aspartyl-L-phenylalanine methyl ester hydrochloride and Morrex (DE=10) was prepared in the following manner:

70 milligrams of L-aspartyl-L-phenylalanine methyl ester hydrochloride was added to 70 milligrams Morrex (DE=10) and was allowed to dissolve in 100 ml distilled water giving a final concentration of 0.07% L-aspartyl-L-methyl ester hydrochloride. The solution was subsequently freeze-dried.

The resulting freeze-dried material was sweet and required 7-8 seconds to dissolve as compared to the unsubstituted L-aspartyl-L-phenylalanine methyl ester which required 4.5 to 5 min. to dissolve completely.

EXAMPLE IV

The hydrobromic salt of aspartyl phenylalanine was prepared by recrystallizing the sweetener from an HBr solution in the following manner:

Four grams of aspartyl phenylalanine methyl ester was dissolved in 50 ml of a 0.05 M HBr solution. A voluminous precipitate separated from this solution a few minutes after stirring at room temperature. The needles were filtered off under vacuum and vacuum air dried. At a concentration of 0.07% (by weight) the needles dissolved with stirring in room temperature water in less than 5 seconds and in approximately 30 seconds in cold carbonated water without stirring. The resulting solutions had the same sweetness intensity as unmodified aspartyl phenylalanine methyl ester and no sour taste was detectable. In addition, the hydrobromic salt of aspartyl phenylalanine methyl ester was found to dissolve at 7.5% whereas the absolute solubility of aspartyl phenylalanine methyl ester is 1%.

What is claimed:

1. An artifically sweetened foodstuff comprising a foodstuff and a dry dipeptide sweetener from the formula

wherein:
the stereochemical configuration is DL-DL, DL-L, L-DL, or L-D;
X represents a halide;
$n$ represents an integer of 0 to 5;
R represents lower alkyl, lower alkylaryl and cycloalkyl;
$R_1$ represents
a. lower alkyl,
b. a substituted or unstubstituted unsaturated, partially saturated or totally saturated six carbon hydrocarbon ring provided that when substituted, the substituent is at the four position and is hydroxy, lower alkoxy, lower alkyl or halogen; and
c. $S(O)_m$ (lower alkyl) provided that $n$ is 1 or 2 and $m$ is 0, or 2,
said dry dipeptide sweetener being present in an amount effective to sweeten the foodstuff, said dipeptide salt being faster to dissolve than the corresponding unsubstituted dipeptide sweetener.

2. The foodstuff of claim 1 wherein;
$n$ represents 0 to 1;
X represents chloride;
R represents lower alkyl; and
$R_1$ represents phenyl, cyclohexyl, benzyl, 1,4-cyclohexadienyl or 1-cyclohexenyl.

3. The foodstuff of claim 2 wherein;
the stereochemical configuration is L-L;
R is methyl, and
$R_1$ is phenyl 4. The foodstuff of claim 3 wherein the sweetener is L-aspartyl-L-phenylalanine methyl ester hydrochloride.

5. A method of sweetening a foodstuff which comprises adding thereto a dry dipeptide salt sweetener of the formula

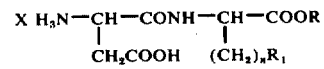

wherein:
the stereochemical configuration is DL-Dl, DL-L, L-DL, or L-L;
X represents a halide;
$n$ represents an integer of 0 to 5;
R represents lower alkyl, lower alkylaryl
$R_1$ represents
a. lower alkyl,
b. a substituted or unsubstituted unsaturated, partially saturated or totally saturated six carbon hydrocarbon ring provided that when substituted, the substituent is at the four position and is hydroxy, lower alkoxy, lower alkyl or halogen; and c. S(O)$_m$ (lower alkyl) provided that $n$ is 1 or 2 and $m$ is 0, or 2, said dry dipeptide salt sweetener being present in an amount effective to sweeten the foodstuff, said dipeptide salt being faster to dissolve than the corresponding unsubstituted dipeptide sweetener.

6. The method of claim 5 wherein;

$n$ represents 0 or 1;

X represents chloride;

R represents lower alkyl; and

R$_1$ represents phenyl, cyclohexyl, benzyl, 1,4-cyclohexadienyl or 1-cyclohexenyl.

7. The method of claim 6 wherein;

the stereochemical configuration is L-L;

R is methyl, and

R$_1$ is phenyl.

8. The method of claim 7 wherein the sweetener is L-aspartyl-L-phenylalanine methyl ester hydrochloride.

9. A dry sweetening composition comprising a dipeptide salt sweetener selected from the formula

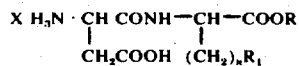

encased in a dry, edible carrier selected from the group consisting of hydrophilic colloids not having free amine groups, water dispersible dextrins, partially hydrolyzed starches, sugars, and mixtures of any of these, said dipeptide salt being faster to dissolve than the corresponding unsubstituted dipeptide sweetener.

10. The composition of claim 9 wherein:

$n$ represents 0 or 1;

X represents chloride;

R represents lower alkyl; and

R$_1$ represents phenyl, cyclohexyl, benzyl, 1,4-cyclohexadienyl or 1-cyclohexenyl.

11. The composition of claim 10 wherein:

stereochemical configuration is L-1;

R is methyl, and

R$_1$ is phenyl.

12. The composition of claim 11 wherein the sweetener is L-aspartyl-L-phenylalanine methyl ester hydrochloride.

13. The composition of claim 12 wherein the carrier is a non-hygroscopic carbohydrate.

14. The composition of claim 9 wherein the sweetener is L-aspartyl-L-cyclohexylalanine hydrochloride.

15. The composition of claim 9 wherein the carrier is a non-hygroscopic carbohydrate.

* * * * *